United States Patent [19] [11] Patent Number: 5,050,781
Cloup [45] Date of Patent: Sep. 24, 1991

[54] DEVICE FOR DOSING A LIQUID CONTAINED IN A FIRST CHAMBER AND FOR TRANSFERRING SMALL DOSES THEREOF INTO A FLUID FLOWING IN A SECOND CHAMBER

[76] Inventor: Philippe Cloup, Cauze de Francs, 33570 Lussac, France

[21] Appl. No.: 463,610

[22] Filed: Jan. 11, 1990

[30] Foreign Application Priority Data

May 16, 1989 [FR] France ................. 89 06384

[51] Int. Cl.⁵ ............................................. G01F 11/00
[52] U.S. Cl. .................................... 222/305; 222/354; 222/361; 222/366
[58] Field of Search ............... 222/216, 217, 344, 361, 222/366, 305–307, 354, 355, 424.5

[56] References Cited

U.S. PATENT DOCUMENTS

| 1,233,791 | 7/1917 | Kaiser | 222/361 X |
| 3,285,669 | 11/1966 | Clark | 222/361 X |
| 3,669,318 | 6/1972 | Goksel | 222/366 X |
| 4,127,151 | 11/1978 | Ueda et al. | 222/361 X |
| 4,331,268 | 5/1982 | Chisholm | 222/361 |
| 4,687,408 | 8/1987 | Klambauer | 222/361 X |

FOREIGN PATENT DOCUMENTS

| 2455269 | 1/1978 | France . |
| 596832 | 2/1978 | U.S.S.R. . |
| 872966 | 11/1979 | U.S.S.R. . |
| 1278589 | 7/1985 | U.S.S.R. . |

Primary Examiner—Michael S. Huppert
Assistant Examiner—Kenneth DeRose
Attorney, Agent, or Firm—Lowe, Price, LeBlanc and Becker

[57] ABSTRACT

A dosing device is provided for introducing small doses of a liquid contained in a first chamber into a second liquid flowing in a second chamber. The device includes a body traversed by a bore which fluidly connects the chambers to one another and in which slides a push pin mounted on a sliding member and a follower pin mounted freely between the push pin and an abutment bar attached to the sliding member. The sliding member reciprocates parallel to the axis of the bore whereby the follower pin is pushed in one direction by the abutment bar and in the opposite direction by the push pin. A space separating the follower pin from the push pin constitutes the dosing chamber which is displaced between the first and second chambers.

12 Claims, 4 Drawing Sheets

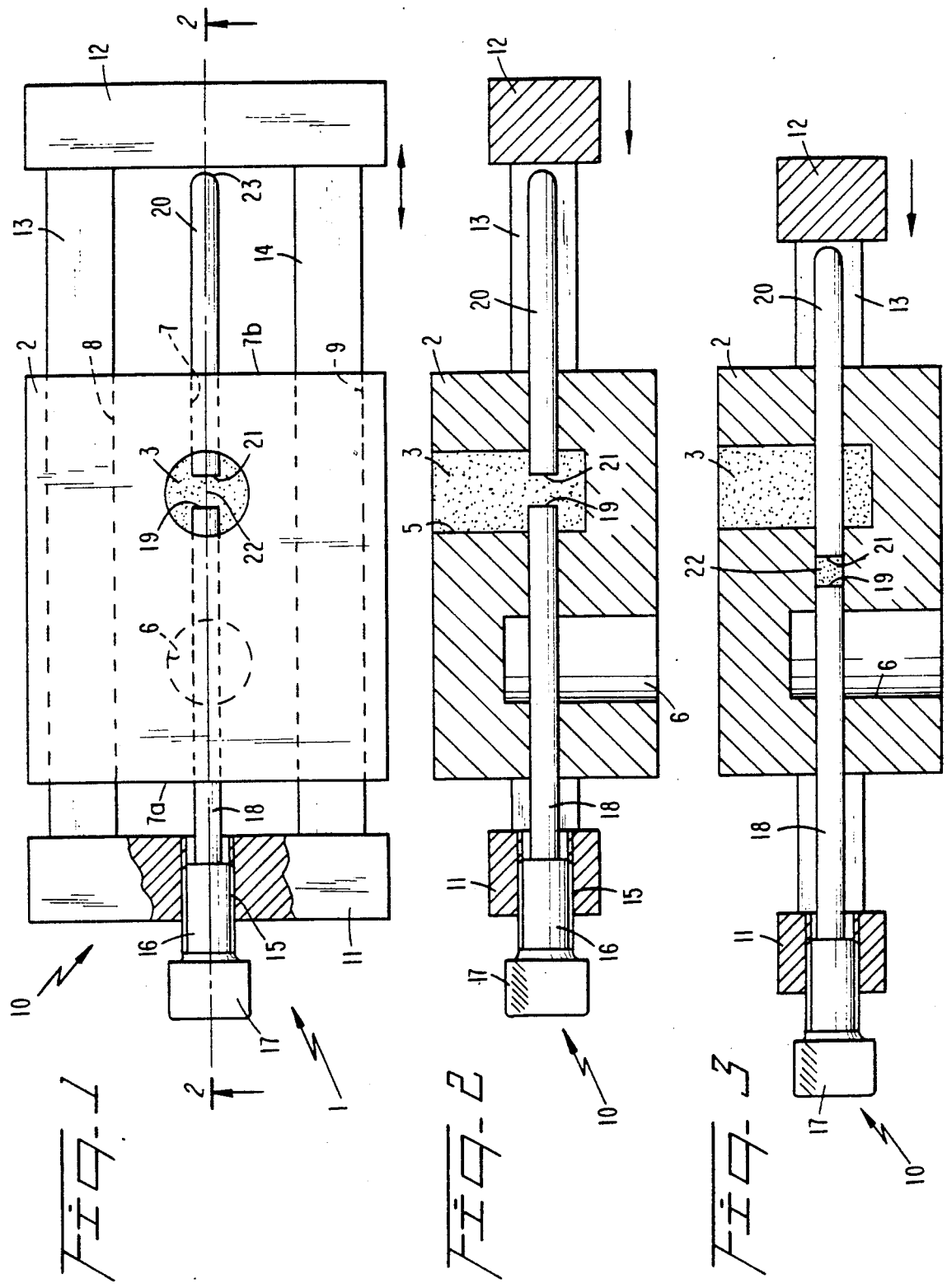

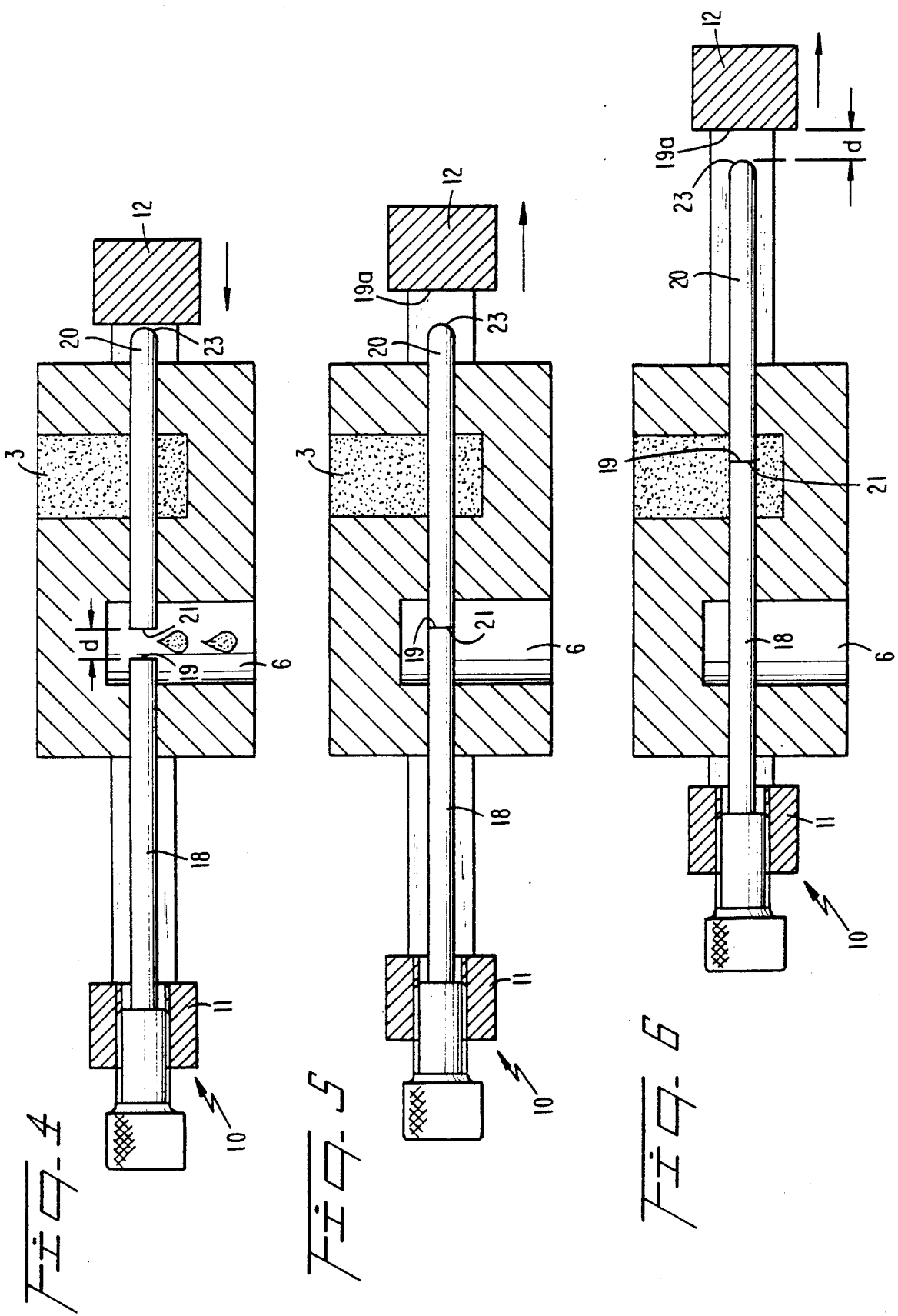

DEVICE FOR DOSING A LIQUID CONTAINED IN A FIRST CHAMBER AND FOR TRANSFERRING SMALL DOSES THEREOF INTO A FLUID FLOWING IN A SECOND CHAMBER

FIELD OF THE INVENTION

The present invention relates to a device for dosing a first liquid contained in a first chamber and to be transferred by small doses into second fluid flowing into a second chamber.

BACKGROUND OF THE INVENTION

In numerous applications, as for example water treatment, it is necessary to add doses of a first liquid such as bleach to water being treated. Numerous devices exist to this effect. Such devices generally comprise an injection system and seals, with potentially damaging calcium deposits often forming on the injection system and seals, particularly when the water being treated is hard.

The object of the present invention is to provide a dosing device which overcomes these drawbacks and which is simple and relatively inexpensive.

SUMMARY OF THE INVENTION

This object is obtained according to the invention which comprises a device including a body in which are formed at least two cavities, a first cavity, called the dosing cavity, communicating with a first chamber and containing a first liquid, and a second cavity, called the distribution cavity, communicating with a second chamber, and a recess having a regular geometric shape, either rectilinear with respect to a central axis or curvilinear about a rotational axis, and having a section in fluid communication with both of said cavities;

a member mobile, either in translation along said central axis, or in rotation about said rotational axis, housed sealingly at least partially in said recess and having two abutment surfaces in facing relation delimiting therebetween a free space, either rectilinear along said central axis, or curvilinear about said rotational axis, a first of said abutment surfaces, called the internal abutment surface, being adapted to alternatively penetrate into said cavities, and the second abutment surface, called the external abutment surface, being situated on the side of the dosing cavity with respect to the distribution cavity;

a follower element, sealingly housed and slidable in said free space and at least partially in said recess, having a shape adapted to that of said free space and having an internal end face and an external end face, situated respectively in facing relation to said internal abutment surface and to said external abutment surface, said internal end face being adapted to alternatively penetrate into said cavities and the rectilinear or curvilinear distance separating said abutment surfaces being greater than the rectilinear or curvilinear distance separating said end faces by a distance d corresponding to the maximum travel of the follower element with respect to the mobile member, the distance d being less than the rectilinear length of the section of the recess in fluid communication with both cavities;

means for locking the follower element with respect to said body when the internal end surface is situated in the distribution cavity; and, a mechanism for controlling the mobile member adapted to displace the mobile member in a reciprocating movement either rectilinear with respect to a central axis or in rotation about the rotational axis, between a first position in which the internal abutment surface and the internal end face are juxtaposed in the dosing cavity, and a second position in which the internal abutment surface and the internal end face are in the distribution cavity and are separated from one another by the distance d.

By virtue of the foregoing structure the injection system present in prior art devices is eliminated. The follower element is driven by the reciprocating movement of the mobile member and only a part of the surfaces of the follower element, the mobile member and the recess are in temporary contact with the fluid being treated contained in the second chamber. The dosing chamber, which comprises a portion of the free space situated between the internal abutment surface and the internal end face, has a volume which is constant and greatest when the follower element is displaced in a direction oriented from the dosing cavity toward the distribution cavity. When the follower element is displaced in the opposite direction the volume of the dosing chamber is effectively reduced to zero.

According to a preferred embodiment, the recess formed in the body is delimited by the walls of a rectilinear bore completely traversing said body and of which a section connects the two cavities, the follower element constituting a follower pin having a diameter substantially equal to theat of the bore, and the mobile member including a push pin also having a diameter substantially equal to that of the bore, said push pin being housed at least partially in the bore on the side of the body in which is formed the distribution cavity. The end of said mobile member located within the body forms the internal abutment surface, and an abutment bar attached to the push pin and situated outside the body on the same side thereof as the dosing cavity comprises, facing said bore, a surface forming said external abutment surface. According to this embodiment of the invention a rectilinear reciprocating movement parallel to the axis of the bore is imparted on the mobile member by a control mechanism.

According to a first variant of this embodiment, the follower pin includes a longitudinal hole parallel to the axis of the bore and the push pin is fixed with respect to the abutment bar by a linking pin which connects the internal abutment surface to the external abutment surface and which is at least partially sealingly housed in said longitudinal hole.

According to another variant the end of the push pin opposite the internal abutment surface is situated outside the body and the push pin is fixed with respect to the abutment bar by a support bar fixed to the external end of the push pin and by at least one linking pin connecting the support bar to the abutment bar.

In order to afford adjustment of the volume of the dosing chamber, the push pin is mounted on the support bar using regulating means which permit the adjustment of the distance separating the internal abutment surface of the push pin from the abutment bar.

The regulating means comprise a threaded bolt coaxially fixed to the outer end of the push pin and mounted in a threaded bore provided in the support bar coaxial with the bore formed in the body.

Advantageously, the linking pin connecting the support bar and the abutment bar is parallel to the push pin and is guided parallel to said bore in a housing formed in the body.

The support and abutment bars may each constitute a parallelepipedonal block of which a large surface faces the bore. The ends of the respective bars may be connected by means of two linking pins provided on either side of the push pin.

According to another embodiment, the recess formed in the body is delimited by a curvilinear surface which is formed about an axis of rotation. The mobile member constitutes in this embodiment a disk which conforms to the recess and is housed therein. The mobile member includes a sectorial notch angularly delimited by two walls situated in planes passing through the axis of rotation of the recess and is moved in reciprocating rotation about said axis of rotation by means of the control mechanism in such a way that one of said walls may penetrate alternatively into one of said cavities. The follower element constitutes a disc section which is sealingly housed in the space of the recess delimited by the notch and has an apex angle inferior to the angle formed by the planes of the walls which delimit said notch.

Advantageously, the body comprises a third cavity communicating with the second chamber, situated symmetrical to the second cavity with respect to the dosing cavity and connected to the dosing cavity by a second section of said recess. Furthermore the external abutment surface is advantageously adapted to penetrate alternatively into the first cavity and the third cavity in response to the control mechanism.

BRIEF DESCRIPTION OF THE DRAWINGS

Other advantages and features of the invention will become apparent in the following detailed description of the several embodiments of the invention in which reference is made to the accompanying drawings in which:

FIG. 1 is a plan view of a first embodiment of the dosing device according to the invention, FIGS. 2 through 6 are sectional views of the device taken along line II—II of FIG. 1 showing the respective positions of the slide and of the follower pin during the various phases of an operation cycle of the device.

DETAILED DESCRIPTION OF THE INVENTION

Figure 7:
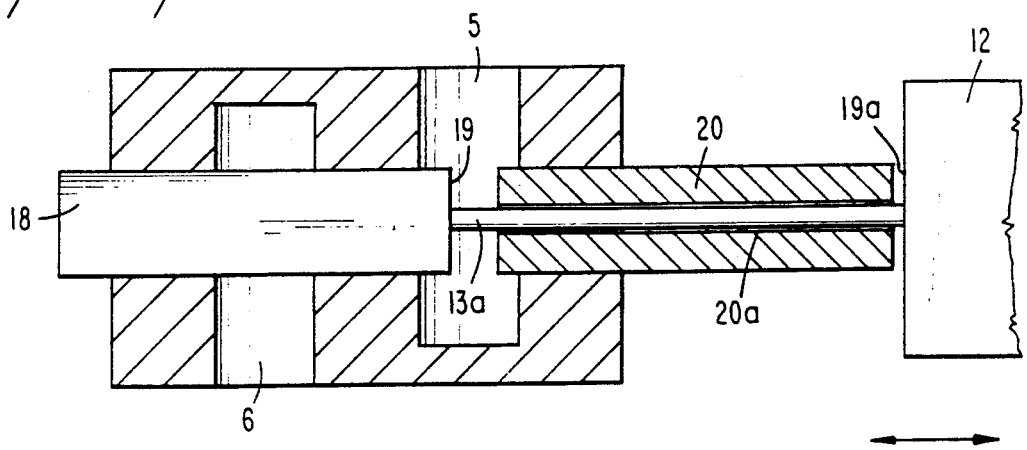
FIG. 7 is a sectional view of a second embodiment of the dosing device.

As can be seen from the drawings the dosing device 1 comprises a body 2 in which is formed a first cavity 3 open through the upper face of the body, called the dosing cavity of the body 2, and communicating with a first chamber (not shown) containing a first liquid 5, and a second cavity 6, called the distribution cavity, communicating with a second chamber or, preferably, a conduit (not shown) in which flows a second fluid to be treated, for example water. In the first embodiment shown in FIGS. 1 through 6 a bore 7 completely traversing the body 2, passing through cavities 3 and 6, opens onto lateral faces 7a and 7b of the body 2. Parallel to the bore 7 tubular guide recesses 8 and 9 are also formed in the body, on either side of the bore 7.

The dosing device includes, furthermore, a mobile member or slide 10 including a support bar 11 and an abutment bar 12 connected to one another by means of two linking pins 13 and 14 partially housed in the tubular guide recesses 8 and 9 respectively. The distance separating the support bar 11 from the abutment bar 12 is greater than the sum of the distance separating the lateral faces 7a and 7b and the distance separating the cavities 3 and 6.

The support bar 11 is situated in facing relation to the surface 7a on the side of the body in which is formed the second cavity 6 and the abutment bar 12 is situated in facing relation to the lateral surface 7b on the the side of the body in which is formed the first cavity 3.

The support bar 11 comprises a threaded bore 15 coaxial with the bore 7 in which is mounted a threaded bolt 16 provided with an adjustment knob 17.

A push pin 18, fixed to the end of the threaded bolt 16 situated in facing relation to the bore 7 and extending toward the abutment bar 12, is partially and sealingly housed in the bore 7. The length of the push pin 18 is less than the distance separating the support bar 11 and the abutment bar 12, and is designed in such a way that the free end 19 thereof is situated in the bore 7 of the body 2. The diameter of the push pin 18 is substantially equal to that of the bore 7.

The follower pin 20, of which the diameter is substantially equal to that of the bore 7 and of which the length is less than the distance separating the free end 19 of the push pin 18 and the abutment bar 12, is interposed between the free end 19 and the abutment bar 12, whereby the internal end face 21 adjacent the free end 19 is situated in the bore 7.

A reciprocating back and forth movement parallel to the bore 7 can be imparted on the slide 10 by the control mechanism (not shown in the drawings), whereby the slide can be displaced between two extreme positions, a first position situated to the right in the figures and shown in FIG. 6, in which the push pin 18 is located within the bore 7, and a second position to the left in the drawings and shown in FIG. 4, in which the push pin 18 is primarily outside the bore 7 and the abutment bar 12 is adjacent the lateral face 7b.

The travel of the slide 10 is slightly greater than the distance separating the axes of the two cavities 3 and 6, and the length of the push pin 18 is such that the free end 19 thereof is situated in the first cavity 3 when the slide 10 is in the first position (FIG. 6), and in the second cavity 6 when the slide 10 is in the second position (FIG. 4).

The length of the follower pin 20 is such that in the first position of the slide 10 the internal end face 21 thereof adjacent the free end 19 of the push pin 18 is situated in the first cavity 3 and in contact with the push pin 18 (FIG. 6) and furthermore, that in the second position of the slide 10, the internal end face 21 is situated in the second cavity 6 and spaced from the free end 19 of the push pin 18 by a distance d which, multiplied by the cross sectional area of the bore, gives the volume of one dose 22 of liquid 5 (FIG. 4). The distance d can be adjusted by rotation of the adjustment knob 17, which alters the volume of a dose 22, the distance d is the length of maximum travel of the follower pin 20 with respect to the push pin 18 and is less than the length of the section of the bore 7 which connects the cavities 3 and 6.

During the displacement from right to left of the slide 10, the abutment bar 12 first contacts the external end face 23 of the follower pin 20, distal from the push pin 18 and which, at the beginning of the movement (FIG. 6), was spaced from the abutment bar 12 a distance d, the free end 19 of the push pin 18 being at this point separated at distance d from the follower pin 20 (FIG. 2). The follower pin 20 and the push pin 18 are then displaced whereby the internal ends 19 and 21 thereof in cooperation with the wall of the bore 7 capture a dose 22 of the first liquid 5 (FIG. 3). At the end of the stroke of the slide 10 toward the left (FIG. 4), the dose 22 is transferred into the second cavity 6 where the dose is diluted in the second fluid contained in the cavity 6.

During the opposite stroke of the slide 10 from left to right, the free end 19 of the push pin contacts the adjacent inner end face 21 of the follower pin 20 (FIG. 5), then the push pin 18 pushes the follower pin 20 toward the right (FIG. 6).

The free end 19 of the push pin 18 thus forms an internal abutment surface for the follower pin 20 and the face 19a of the abutment bar 12 situated in facing relation to the bore 7 forms an external abutment surface for the follower pin 20. These two abutment surfaces 19 and 19a define a free rectilinear space in which the follower pin 20 is placed. The difference between the volume of this free space and the volume of the follower pin corresponds to the volume of a dose 22 of liquid 5 transferred from the dosing cavity 3 toward the distribution cavity 6 with each stroke of the mobile member or slide 10. Seals (not shown) may be provided in annular recesses formed in the wall of the bore 7 in order to provide for the tightness of seal between various chambers.

While the friction forces applied on the follower pin 20 by the walls of the bore 7 and by the seals are relatively weak, these will normally suffice to prevent the pressure present in the second cavity 6 and which results in a force exerted on the internal end 21 of the follower pin 20 when this internal end 21 is situated in a second cavity 6, from displacing the follower pin 20 to the right and thus maintaining the latter in contact with the abutment bar 12 during movement from the left to the right of the slide 10, (which would otherwise result in the transfer of a dose of the second fluid being treated from the second cavity 6 toward the first cavity 3).

In the event that the friction forces are insufficient to retain the follower pin 20 during the beginning of the return stroke of the slide, locking means of a generally known type, comprising for example one or more balls subjected to elastic forces and cooperating with annular grooves formed in the walls of the follower pin 20, or alternatively using magnetic forces, may be provided.

FIG. 7 shows a second embodiment which differs from the first by the fact that the link between the push pin 18 and the abutment bar 12 takes the form of a linking pin 13a which connects the internal abutment surface 19 of the push pin 18 to the external abutment surface 19a of the abutment bar 12 situated in facing relation to the free end 19 and housed partially and sealingly in a longitudinal hole 20a parallel to the bore 7 and formed in the follower pin 20, the latter taking the form of a sleeve which slides on the linking pin 13a over a distance d.

In this second embodiment the support bar 12 and the linking pins 13 and 14 of the first embodiment may be advantageously eliminated and the distance separating the internal abutment surface 19 of the push pin 18 from the external abutment surface 19a of the abutment bar 12 may be adjusted by means of a knob (not shown in FIG. 7), by means of which the linking pin 13a is connected to the abutment bar 12.

Figure 8:
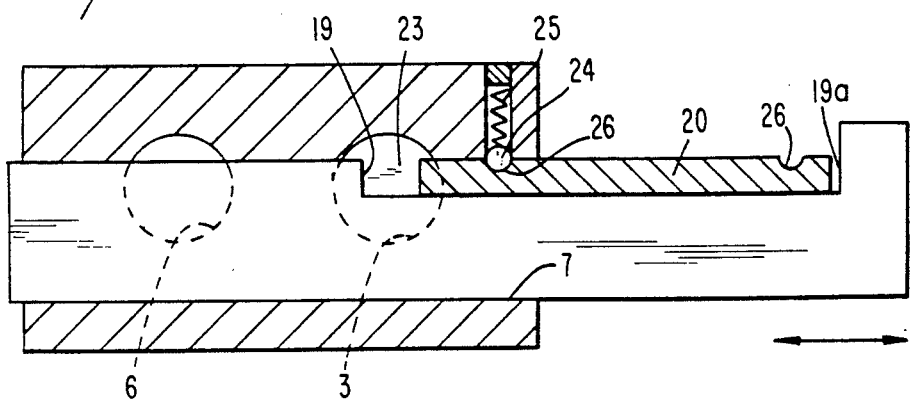
FIG. 8 is a sectional view of a third embodiment.

FIG. 8 shows a third embodiment of the dosing device in which the slide 10 takes the form of a bar mounted to sealingly slide in an appropriately profiled bore, of for example round or rectangular cross section. The slide 10 in this embodiment comprises on one of its faces, which faces into cavities 3 and 6, a notch 23 or free space having two abutment surfaces in facing relation 19 and 19a between which a follower bar or pin 20 sealingly slides, the length of the latter being inferior to the distance separating the abutment surfaces 19 and 19a. Locking means comprise a ball 24 maintained by a spring 25 provided in the body 2 in contact with the follower pin in such a way as to cooperate with recesses 26 formed in the follower pin 20.

Figure 9:
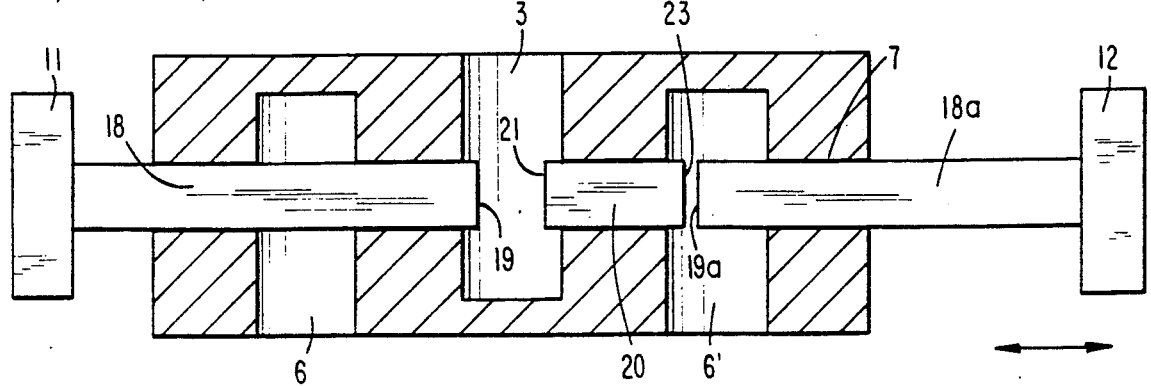
FIG. 9 shows a further embodiment.
Figure 10:
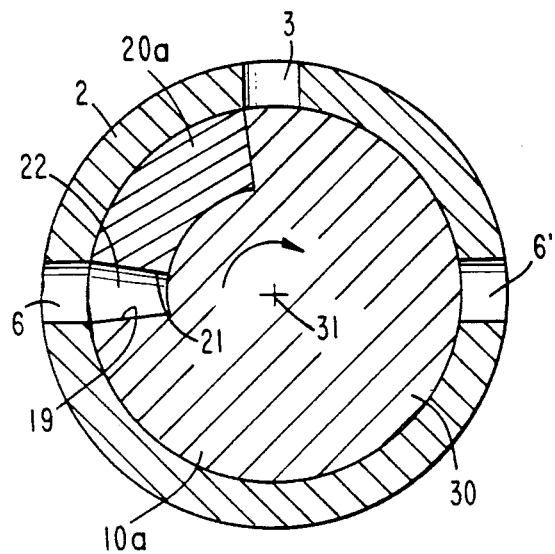
FIGS. 10 through 13 show a fifth embodiment in the various phases of an operation cycle.
Figure 11:
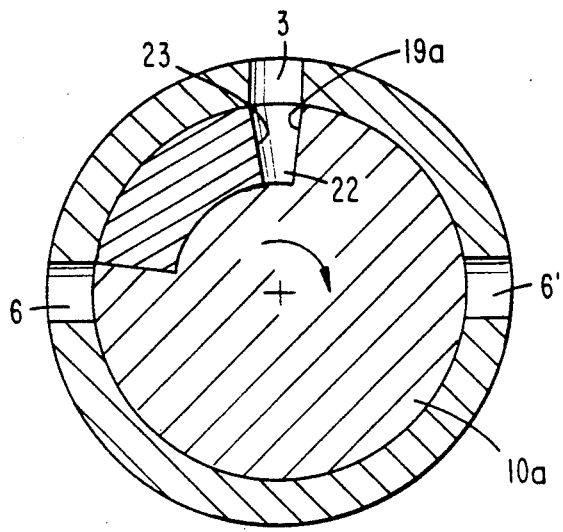
Figure 12:
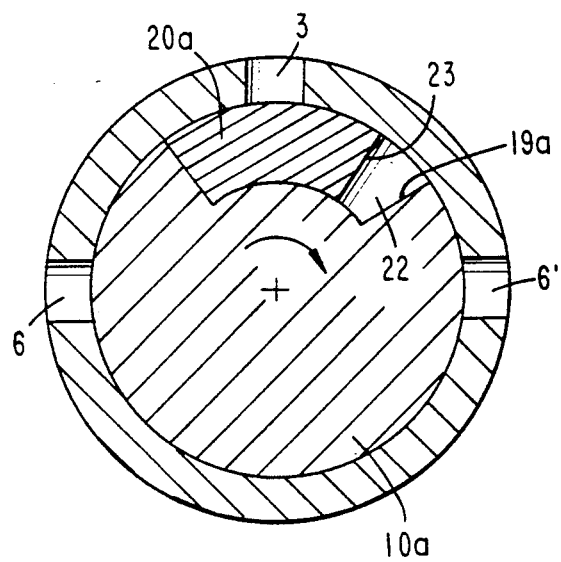
Figure 13:
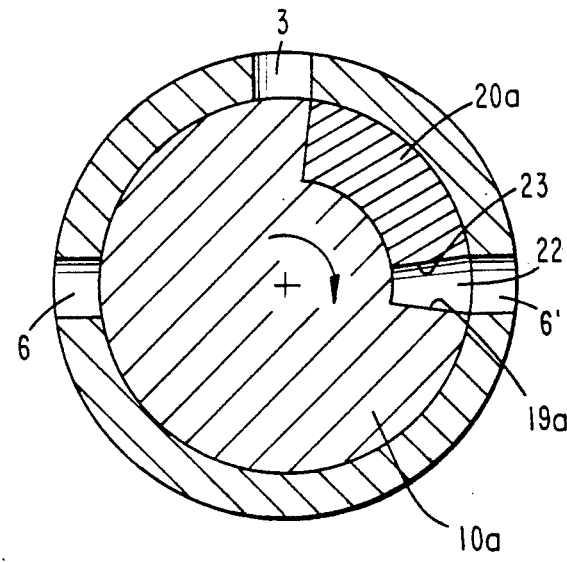

The embodiment shown in FIG. 9 comprises a third cavity 6' which communicates with the first chamber and is formed in the body symmetric to cavity 6 with respect to the dosing cavity 3. The bore 7 connects the three cavities 3, 6 and 6' in fluid communication and the slide 10 comprises symmetrically two push pins 18 and 18a of which respective internal abutment surfaces 19 and 10a are situated in facing relation within the bore 7. The follower pin 20 is placed between the push pins 18 and 18a whereby the ends thereof are respectively in facing relation to the internal abutment surfaces 19 and 19a. A reciprocating movement is imparted on the slide 10 between a first position in which the internal abutment surfaces 19 and 19a are respectively in cavities 3 and 6' and a second position in which the internal abutment surfaces are located respectively in cavities 6 and 3. During the passage from the first to the second position, a dose 22 of liquid 5 is transferred from cavity 3 to cavity 6, and similarly in passing from the second to the first position a dose 22 of liquid 5 is transferred from cavity 3 to cavity 6'.

FIGS. 10 through 13 show the various positions of the dosing device according to a fifth embodiment. The body 2 includes a curvilinear or arcuate recess 30 having the form of a cylindrical section which may fluidly connect a first cavity 3 with distribution cavities 6 and 6' disposed symetrically with respect to a plane passing through the rotational axis 31 of the cylindrical recess 30 and through the dosing cavity 3.

The slide 10 of the preceding embodiments is replaced in this embodiment with a mobile member in the form of a disc 10a which conforms to the recess 30 and is housed sealingly therein. The disc 10a is provided with a curvilinear or arcuate notch delimited by two walls 19 and 19a situated in planes passing through the axis of rotation 31 of the disc 10a. A reciprocating rotational movement about the axis of rotation 31 is imparted on the disc 10a by a control mechanism (not shown).

The follower pin 20 of the previous embodiments is here replaced with a follower element comprising a disc section 20a which is sealingly housed in the arcuate notch of the disc 10a and which has end faces 21 and 23 respectively in facing relation to the walls 19 and 19a of the disc 10a. The angle formed by the faces 21 and 23 is inferior to the angle formed by the planes in which are situated walls 19 and 19a so as to leave a chamber for the dose 22 which has a volume equal to the difference between the volume of the sectorial notch and the volume of the follower element 20a.

The angular dimension of the arcuate notch is such that in a first extreme position the walls 19 and 19a are situated respectively in cavities 6 and 3, while in a second extreme position the walls 19 and 19a are respectively in cavities 3 and 6'.

What is claimed is:

1. A device for dosing a first liquid contained in a first chamber and for transferring small doses thereof into a fluid flowing in a second chamber, comprising:
    a body having a first cavity, called the dosing cavity, and a second cavity, called the distribution cavity, situated beside the dosing cavity in said body, and a recess having a regular geometric shape and of which a portion joins the first cavity and the second cavity;
    a mobile member housed partially and sealingly in said recess and having two abutment surfaces situated in mutually facing relation and separated from one another by a predetermined distance whereby a free space is delimited therebetween, the first of said abutment surfaces, called the internal abutment surface, penetrating alternatively into said cavities, and the second of said abutment surfaces, called the external abutment surface, being situated adjacent said dosing cavity with respect to said distribution cavity;
    a follower element housed sealingly and slidably in said free space and at least partially in said recess, said follower element having a shape conforming to said free space, as well as an internal end face and an external end face situated respectively in facing relation to said internal abutment surface and said external abutment surface, said internal end face penetrating alternatively into said cavities, said end faces being separated by a first distance which is less than a second distance separating said abutment surfaces, by a third distance (d) corresponding to a maximum stroke of the follower element relative to said mobile member, said maximum stroke being less in length than the portion of the recess which joins the two cavities to one another;
    means for blocking the follower element with respect to said body in a position in which the internal end face of the follower element is in the distribution cavity; and,
    the mobile member being displaced in a reciprocating movement between a first position in which the internal abutment surface and the internal end face are juxtaposed in said dosing cavity, and a second position in which the internal abutment surface and the internal end face are situated in the distribution cavity and separated from one another by said third distance.

2. A device as claimed in claim 1, wherein said recess and said free space are rectilinear along a longitudinal axis, and wherein said mobile member is displaced along said longitudinal axis.

3. A device as claimed in claim 1, wherein said recess and said free space are curvilinear about a central axis of rotation, and wherein said mobile member is angularly displaced about said rotational axis.

4. A device as claimed in claim 1, wherein said recess is delimited by the walls of a rectilinear bore completely traversing said body and of which a portion joins said cavities to one another; wherein said follower element is a cylindrical follower pin having a diameter substantially equal to the diameter of said bore; further wherein said mobile member includes a cylindrical push pin having a diameter substantially equal to the diameter of said bore and housed at least partially in said bore on a side of said body in which is provided said distribution cavity, said push pin having an internal end comprising said internal abutment surface as well as an abutment bar attached to said push pin, situated outside of said body on a side thereof in which is provided said distribution cavity and having a face comprising said external abutment surface in facing relation to said bore; and wherein said mobile member reciprocates parallel to said bore.

5. A device according to claim 4, wherein said follower pin is provided with a longitudinal hole parallel to said bore, and wherein said push pin is attached to said abutment bar by means of a linking pin connecting said internal abutment surface to said external abutment surface, said linking pin being housed partially and sealingly in said longitudinal hole.

6. A device according to claim 4, wherein said push pin has an end opposite said internal abutment surface situated external to said body, and wherein said push pin is attached to said abutment bar by a support bar fixed to the external end of said push pin and by at least one linking pin connecting said support bar to said abutment bar.

7. A device according to claim 6, wherein said push pin is housed on said support bar along with means for adjusting the distance separating the internal abutment surface of said push pin from said abutment bar.

8. A device according to claim 7, wherein said adjusting means comprises a threaded bolt coaxially fixed to the external end of said push pin and mounted in a threaded bore provided in said support bar coaxial with said bore in said body.

9. A device according to claim 6, wherein said linking pin connecting said support bar to said abutment bar is parallel to said push pin and is guided parallel to said bore in a guide recess provided in said body.

10. A device according to claim 6, wherein said support bar and said abutment bar each comprises a parallelepipedonal block having a large surface in facing relation to said bore and two ends to each of which is connected a linking pin, said linking pins being placed on either side of said push pin.

11. A device according to claim 1, wherein said recess in said body is delimited by an arcuate wall curvilinear about a rotational axis; wherein the mobile member is a disc conformed to said recess, housed in said recess and having a sectorial notch angularly delimited by two walls oriented in planes passing through said axis of rotation of said recess, said mobile member reciprocally rotating about said rotational axis whereby said walls alternatively enter said cavities; and wherein said follower element is a section of a disc, is sealingly housed within said notch and has an apex angle less than the angle formed by the planes in which are situated the walls of said notch.

12. A device according to any one of claims 1 through 11 wherein said body has a third cavity in communication with said second chamber, symmetrical to said second cavity with respect to said dosing cavity and connected to said dosing cavity by a second portion of said recess, causing said external abutment surface to alternatively enter into said first and said third cavities.

* * * * *